UNITED STATES PATENT OFFICE.

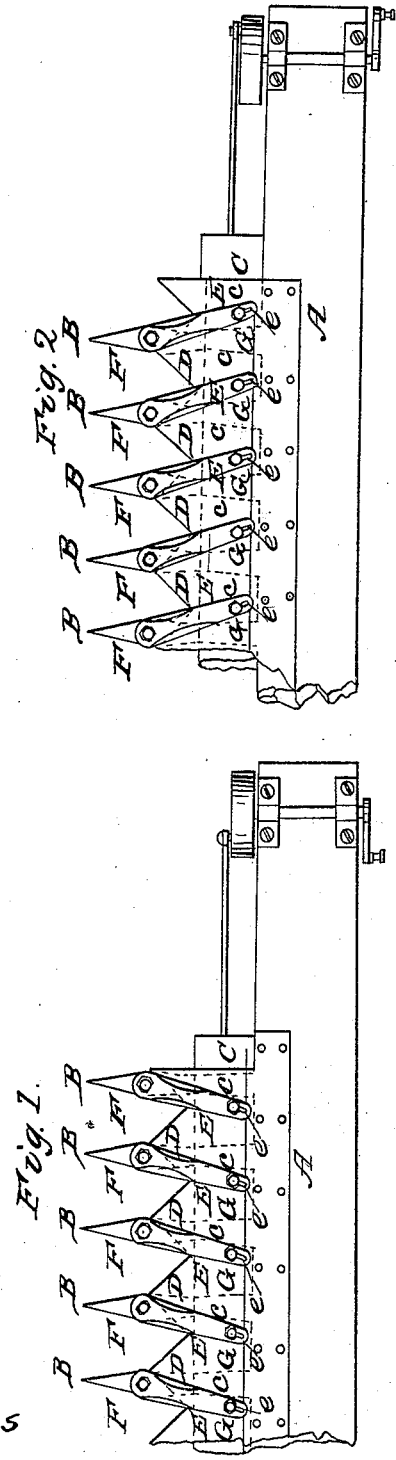

ISAAC C. CRANE, OF EDGERTON, OHIO.

IMPROVEMENT IN HARVESTER-SICKLES.

Specification forming part of Letters Patent No. 42,169, dated April 5, 1864.

*To all whom it may concern:*

Be it known that I, ISAAC C. CRANE, of Edgerton, Williams county, Ohio, have invented a new and useful Cutting Apparatus for Harvesters; and I do hereby declare the following to be a full, clear, and exact description thereof, reference being had to the accompanying drawings, making part of this specification.

The object of my invention is to provide a harvester-sickle or cutting apparatus of more certain effectiveness than those ordinarily in use.

Figures 1 and 2 are upper side views of a portion of a harvester-cutter on my improved plan at the respective ends of the stroke.

A represents a portion of the finger-bar. B are fingers. C is the cutter-bar, having customary sickle-blades D.

Hinged near the points of the fingers are blades E, slotted at $e$, near their free extremities, to receive studs C on the cutter-bar. The blades E are chamfered to cutting-edges, so as to cut shearwise in conjunction with the cutting-edges of the blades D when the cutter-bar is reciprocated to and fro. It will thus be understood that the pivoted blades are operated by direct attachment to the cutter-bar, the slots permitting them to vibrate freely on their pivots, while the cutter-bar by which they are driven is reciprocated in a rectilinear path.

The above-described combination of cutting devices acts to sever the grain or grass more effectively than where the sickle shears against the fingers only.

F and G are set-screws, by means of which the vibrating blades E are set nearer to or farther from the reciprocating blade C D, so as to shear in the most effective manner.

I claim herein as new and of my invention—

In the described combination with the finger-bar A, fingers B, and scalloped reciprocating blade C D, the vibrating blades E, pivoted at their front ends to the fingers and at their rear ends to the reciprocating blade, substantially as represented.

In testimony of which invention I hereunto set my hand.

I. C. CRANE.

Witnesses:
 NORMAN RELYEA,
 E. D. THOMAS.